United States Patent [19]
Hattan

[11] 4,440,149
[45] Apr. 3, 1984

[54] RADIATION COLLECTORS

[75] Inventor: Mark Hattan, Orange, Calif.

[73] Assignee: William P. Green, Pasadena, Calif.; a part interest

[21] Appl. No.: 211,514

[22] Filed: Dec. 1, 1980

[51] Int. Cl.³ .................................................. F24J 3/02
[52] U.S. Cl. .................................... 126/425; 126/438; 126/443; 250/203 R
[58] Field of Search ............... 126/424, 425, 426, 438, 126/439, 440, 442, 443; 250/203 R

[56] References Cited

U.S. PATENT DOCUMENTS

| | | | |
|---|---|---|---|
| 3,125,091 | 3/1964 | Sleeper, Jr. | 126/440 |
| 3,247,840 | 4/1966 | Chambers et al. | 126/425 |
| 4,094,299 | 6/1978 | Voelker | 126/426 |
| 4,126,123 | 11/1978 | Hall | 126/426 |
| 4,170,985 | 10/1979 | Authier | 126/424 |
| 4,179,612 | 12/1979 | Smith | 126/425 |
| 4,225,781 | 9/1980 | Hammons | 126/425 |
| 4,276,122 | 6/1981 | Snyder | 126/425 |
| 4,290,411 | 9/1981 | Russell | 126/425 |

FOREIGN PATENT DOCUMENTS

| | | | |
|---|---|---|---|
| 2901615 | 7/1980 | Fed. Rep. of Germany | 126/438 |
| 824726 | 11/1937 | France | 126/438 |
| 2362347 | 4/1978 | France | 126/438 |

*Primary Examiner*—James C. Yeung
*Attorney, Agent, or Firm*—William P. Green

[57] ABSTRACT

A radiation collector includes a flexible inflatable unit having a portion constructed to concentrate radiation at generally a predetermined location when the unit is inflated, and including a structure positioned to absorb or receive the concentrated radiation. The inflatable unit is preferably a bag of circular cross-section having a front wall transparent to the radiation and a rear concave reflective wall acting to reflect the radiation to the absorbing or receiving structure at the center of the bag. The entire collector may be actuated to follow the sun for reception of solar energy therefrom, and may have photosensing means desirably mounted to the central light-collecting structure for responding to incoming radiation in a manner maintaining the overall assembly in alignment with the sun.

6 Claims, 4 Drawing Figures

RADIATION COLLECTORS

BACKGROUND OF THE INVENTION

This invention relates to improved radiation collectors for receiving, concentrating and responding to incoming electromagnetic radiation. While it is contemplated that devices embodying the invention may be designed to receive and concentrate radiation of various different wavelengths, such as for example radio frequency means or the like, the invention will be described primarily as applied to the collection of solar energy for heating purposes.

There have in the past been proposed solar collectors in which the sun's rays have been concentrated onto a radiation absorptive structure by a parabolic or other concave reflector acting to direct the rays from a relatively wide area to a central location in concentrated form. The amount of radiation which can be collected by such a device is of course dependent upon the size of the reflector, and as that size increases the cost of manufacture of the unit goes up rapidly. Further, the reflective surface if exposed to the elements may deteriorate over a relatively short period of time, and quickly reduce the radiation collecting efficiency of the device.

SUMMARY OF THE INVENTION

The object of the present invention is to provide a radiation collection which can serve the above discussed purpose of concentrating and responding to incoming solar or other radiation, and can do so with high efficiency, but at an equipment cost much less than the discussed prior concave reflectors. Further, a device embodying the invention can be erected for use much more easily and quickly than ordinary concentrating reflectors, and can be moved from place to place with ease. In addition, a collector of the present invention is so constructed as to protect its light directing and concentrating surfaces from direct exposure to and contamination or deterioration by the elements, to thus function effectively at maximum efficiency for an extended period of time much longer than that of which prior reflectors have been capable.

A collector embodying the invention includes a flexible unit which is inflatable and which has a radiation concentrating portion held in functioning position by the inflation of the unit. Such construction thus eliminates the usual requirement for provision of a rigid parabolic dish or other reflector structure for concentrating the radiation. The inflatable unit of the present invention desirably is formed as a flexible bag of essentially circular cross-section, having a front wall through which the solar radiation or other radiation passes to the interior of the bag, and having another wall, desirably extending across the back of the bag, with a reflective concave front surface shaped to reflect the radiation toward a central region in the bag. The reflective surface preferably distributes the concentrated radiation along the axis of the circular bag.

The concentrated radiation is received by a collecting structure, which may be located along the mentioned axis of the bag, and which preferably contains a passage or passages through which water or another fluid flows to be heated by the concentrated radiation.

When the reflector is utilized for concentrating solar energy or other energy from a source moving relative to the earth, the assembly may include tracking means acting to cause the device to follow the relatively moving sun or other radiation source. The tracking means may include mechanism operable to swing the unit in opposite directions within two mutually perpendicular planes, with photosensing means controlling that mechanism to maintain the desired alignment of the device with the sun or other radiation source. The photosensing means may include two pairs of photosensors carried by the radiation collecting structure, with the two photosensors of each pair preferably being located at diametrically opposite sides of that structure, and acting to control movement of the structure in opposite directions and toward a null position of alignment with the radiation.

BRIEF DESCRIPTION OF THE DRAWING

The above and other features and objects of the invention will be better understood from the following detailed description of the typical embodiment illustrated in the accompanying drawing, in which.

DESCRIPTION OF THE PREFERRED EMBODIMENT

Figure 1:
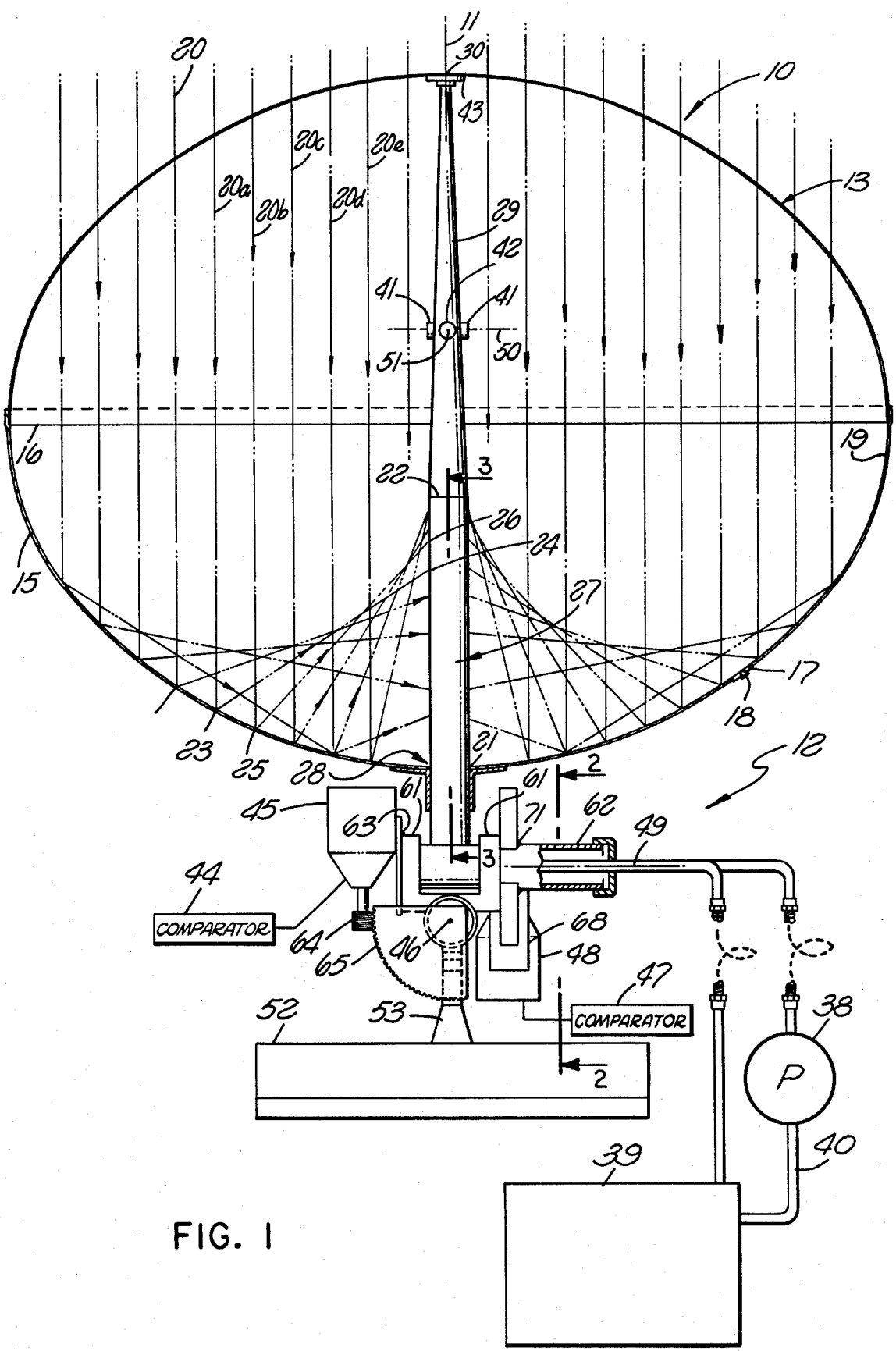
FIG. 1 is an axial sectional view taken through a radiation collector constructed in accordance with the invention.
Figure 2:
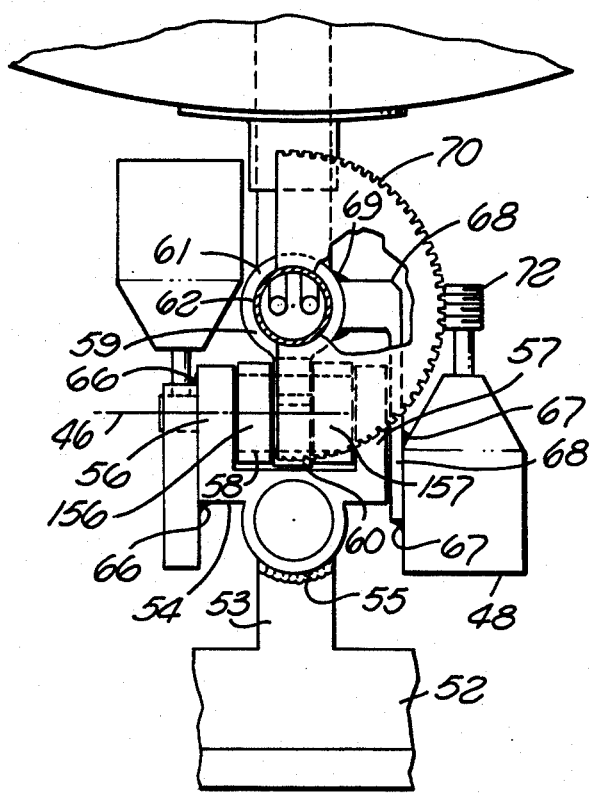
FIG. 2 is a fragmentary side elevational view taken on line 2—2 of FIG. 1.
Figure 3:
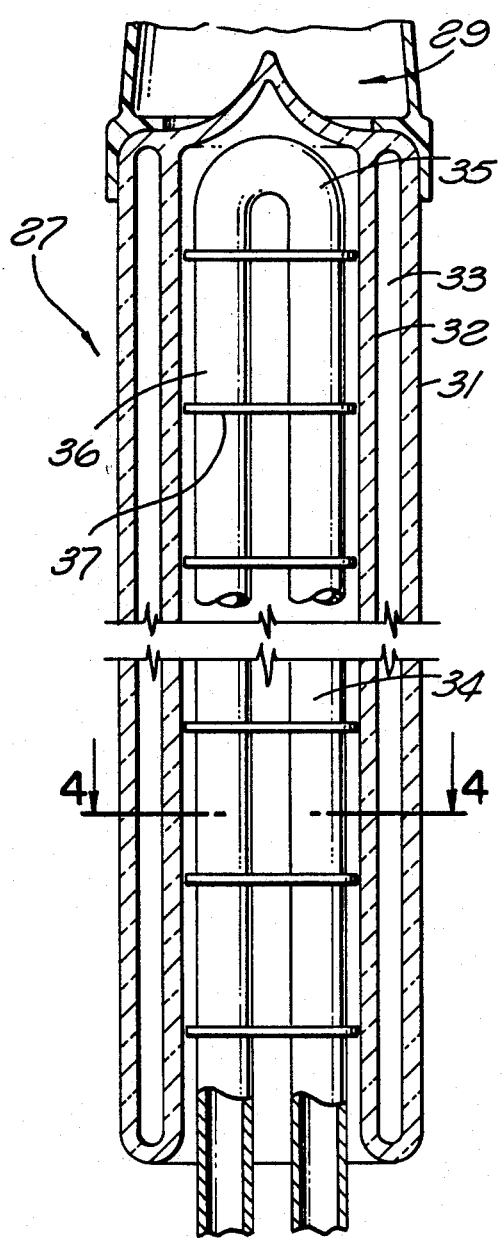
FIG. 3 is an enlarged axial section taken on line 3—3 of FIG. 1.
Figure 4:
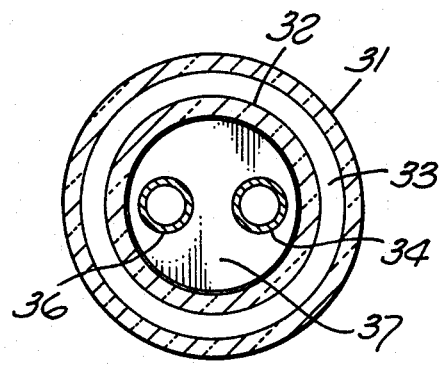
FIG. 4 is a transverse section taken on line 4—4 of FIG. 3.

There is illustrated at 10 in FIG. 1 a radiation collector constructed in accordance with the invention for receiving, concentrating and absorbing radiation coming in along a predetermined axis 11 from a source of such radiation, for example, the sun. Where the source is an object such as the sun which moves relative to the earth, the collector 10 may be mounted by a tracking mechanism typically represented at 12 operable to automatically follow the source and keep the axis 11 of the collector continually aimed directly at the moving source.

The collector includes a flexible inflatable bladder 13 which when inflated is preferably circular and symmetrical about axis 11, and desirably has the axial sectional configuration illustrated in FIG. 1. This bladder may be formed of two complementary identically shaped upper and lower halves 14 and 15 whose edges are joined together annularly in sealed relation along a circumferential line 16. The two halves 14 and 15 may be formed of an appropriate flexible resinous plastic film, such as a thin film of polyvinyl chloride in polyvinyl flouride, typically eighteen mils thick. The bladder may be filled with pressure through an appropriate inlet fitting 17 adapted to be closed in sealed relation by a plug 18 or other closure member. To minimize cost and complexity of manufacture of the bladder, the two sections 14 and 15 may be formed of flat sheet stock, and may be initially cut as circular pieces of such stock of the same diameter. These two sheets may be superimposed one above the other, and their edges may then be annularly bonded together, as by sonic welding, heat sealing, cementing, or the like. The weld 16 between the parts is preferably a lap weld, in which the two edges are turned to axially overlap one another in the manner illustrated in FIG. 1.

When a bladder thus made of two circular pieces welded together is inflated, the sheet material of which the two halves are formed will tend to automatically stretch and deform to the approximately ellipsoidal configuration of FIG. 1 centered about axis 11, to thus attain that approximately elliptical axial sectional configuration without expensive preshaping of the halves to concave form or piecing the halves together to give the bladder that form.

The upper half 14 of the bladder is transparent to the radiation being collected, and passes that radiation directly through the wall of the upper half and to the inner surface of the bottom half 15. For example, if the source of the radiation is the sun, the upper half 14 of the bladder, above circumferential weld line 16, is transparent to solar radiation.

The upper or inner concave surface of bottom half 15 of the bladder is specularly reflective of the radiation being collected, and for that purpose is coated continuously with a layer 19 of specularly reflective material. This reflectivity may be attained by applying a reflective coating of aluminum to the inner surface of bladder section 15, up to the weld line 16.

The solar rays or other radiation which passes through transparent upper wall 14 of the bladder along paths 20 parallel to axis 11 strikes the inner concave reflective surface 19 of the bottom section and is reflected by that surface toward axis 11. It is contemplated that section 15 may if desired be accurately shaped to a parabolic configuration, in which event the parallel ray radiation reflected by that section will be focused at a point within the bladder, and an absorber may then be located at that point to absorb the energy and carry off the developed heat. When the bladder is made in the simpler manner previously discussed, however, by merely joining together two identical circles of resinous plastic material and allowing them to stretch to the shape which they naturally assume when inflated, the configuration of the bottom section will not be a true paraboloid, and the rays 20 will not be focused at a point but rather along a portion of axis 11, as between the locations 21 and 22 of FIG. 1. This reflectivity pattern is illustrated in FIG. 1, in which a first of the rays 20a strikes reflective section 15 at a point 23 and is reflected to a location 24 on the axis, while a second parallel ray 20b strikes reflective surface at 25 and is reflected to a location 26 on the axis offset from the location 24, with the rays 20c, 20d, 20e and other rays all similarly being reflected to different points on the axis.

In order to absorb this radiation distributed linearly along axis 11, the present device includes an absorber 27 which may be connected at its lower end 28 to the center of bottom half 15 of the bladder and projects upwardly along axis 11 to the location 22. Upwardly beyond that location, the absorber rigidly carries an element 29 which continues along axis 11 and connects centrally to the upper transparent half of the bladder at 30.

Absorber 27 may be any structure which is capable of absorbing the radiation being collected, and from which the energy of the radiation can be conducted away. A presently preferred type of absorber for solar collector use is of the type illustrated, including an outer glass tube 31 transparent to solar radiation, an inner coaxial second tube 32 of glass which is spaced radially from tube 31 with a vacuum maintained in the annular space 33 between the tubes. Tube 32 is coated with an absorbing substance and contains a copper tube 34, which extends upwardly within tube 32 at 35 and then doubles back to extend downwardly at 36. Transverse fins 37 of copper or other highly conductive material are connected to tube 34 and are bonded to the inner surface of glass tube 32 to conduct heat therefrom to a fluid flowing within copper tube 24. Water or another liquid to be heated by the collector may be forced under pressure by a pump 38 into one end of U-shaped tube 34, and discharged in heated condition from the opposite end of that tube to a reservoir 39 within which the liquid is contained and from which it may be distributed to a heating system or the like. Water may be recirculated back from the reservoir to pump 38 through a line 40.

The discussed vacuum tube type of collector is known in the art for other heat collecting uses, and has the advantage of avoiding reradiation or reconduction of the heat from the absorber. In lieu of this absorber, a simple copper tube or other liquid conducting conduit or structure may be provided along axis 11 in the area to which the radiation is reflected by bladder section 15, or other collector devices may be employed.

The element 29 may be rigidly connected to the upper end of absorber 27, and project upwardly along axis 11, and may taper progressively and symmetrically about axis 11 as shown. About its outer surface, element 29 may carry four evenly circularly space radiation sensors, including two diametrically opposite sensors 41 and a second pair of diametrically opposite sensors 42 offset 90 degrees from the sensors 41 about axis 11. A circular opaque disc 43 connected to the upper end of element 29 is centered about axis 11 and acts when the axis 11 of the bladder is aligned with the axis of the incoming radiation to shade the four sensors 41 and 42 equally. If the source of energy moves out of alignment with axis 11 of the bladder, one of the sensors 41 will be shaded more than the other, or one of the sensors 42 will be shaded more than the other, and the sensors will therefore produce an output acting to automatically actuate tracking mechanism 12 to return the bladder to its position of proper alignment with the axis of the incoming radiation.

Sensors 41 may be of a type adapted to produce an electrical output when solar radiation falls on them. The outputs of the two diametrically opposed sensors 41 are connected to a comparator 44 which delivers energizing current to a motor 45 to drive it in one direction when a first of the sensors 41 is energized more than the other, and to drive the motor in the opposite direction when the second of the sensors 41 is energized more than the first. As will be described at a later point, motor 45 pivots the entire bladder assembly about an axis 46 in whichever direction is necessary to return the device to proper alignment with the axis of the incoming radiation and to a position in which the differential between the energization of the two sensors 41 no longer exists. A second comparator 47 responds similarly to the two diametrically opposed sensors 42 to energize a motor 48 to pivot the bladder about a second axis 49 to a position in which sensors 42 are equally shaded by disc 43 and the axis of the bladder is therefore aligned with the axis of the incoming radiation. The two pivotal axes 46 and 49 both intersect the main axis 11 of the device, and are perpendicular thereto, and are offset 90 degrees with respect to one another about axis 11. Axis 46 is perpendicular to a plane containing axis 11 and a diameter 50 extending through the centers of sensors 41, while axis 49 is perpendicular to a plane containing axis 11 and a diameter 51 extending through the centers of sensors 42.

The tracking mechanism 12 includes a rigid stationary base 52 which may extend horizontally on a suitable support surface and carry an upwardly projecting stationary post 53. A part 54 welded stationarily to the upper end of post 53 at 55 has two upper aligned axially spaced tubular portions 56 and 57 centered about axis 46 and within which an externally cylindrical shaft 58 is contained and located in a position of extension along axis 46. A part 59 has an annular tubular portion 60 disposed about shaft 58 between two spacers 156 and 157 in a manner mounting part 59 for swinging and pivotal movement about shaft 58 and its axis 46 and relative to the structure 53-54-56-57. Part 59 at its upper end has two axially spaced aligned tubular bearing portions 61 centered about axis 49 and within which a shaft 62 is pivotally mounted for rotary movement about axis 49. The radiation absorbing element 27 is rigidly attached to shaft 62 to pivot therewith. Motor 45 has its case welded at 63 to part 61, and has a driven shaft carrying a worm 64 engaging a partial 90 degree worm gear 65. This worm gear segment 65 is rigidly secured to part 54, as by welding at 66, so that rotation of the motor driven worm 64 in opposite directions acts to pivot parts 61 and the entire bladder assembly about axis 46.

The second motor 48 is welded at 67 to a part 68, whose upper end is rigidly secured to one of the parts 61 as by welding at 69, with a 180 degree worm gear 70 being welded at 71 to shaft 62. A worm 72 driven in opposite directions by motor 48 engages worm gear segment 70 to pivot gear 70 and the connected shaft 62 and absorber 27 as well as the carried bladder about axis 49.

In using the described collector as a solar energy unit, the base 52 is first positioned on a support surface at a location exposed to the solar radiation, and bladder 13 is inflated to a condition such as that illustrated in FIG. 1. The motors may be energized appropriately to initially move the axis 11 of the bladder to a position in which it is aimed directly at the sun, so that the incoming solar rays are parallel to that axis. The comparators 44 and 47 are then energized to respond automatically to uneven sliding of the two diametrically opposed sensors 41 by disc 43, or uneven shading of the two diametrically opposed sensors 42 by that disc, to energize the motors 45 and 48 to respond to any such condition and automatically maintain the axis 11 continuously aimed at the sun.

The incoming radiation passes through transparent upper half 14 of the bladder and strikes its internally reflective concave bottom half 15, to be reflected thereby to axis 11 and to the absorber 27 located along that axis. Pump 38 maintains a flow of water through the interior of absorber 27, to be heated by the reflectively concentrated radiation and then delivered to reservoir 39. The water may flow through the absorber continually, or intermittently and under automatic control to maintain the desired temperature or other condition in reservoir 39 or in other related equipment.

If it is desired to move the collector to another location, the bladder may be easily deflated to reduce the overall size of the entire assembly to a condition in which it can be easily transported, for subsequent reinflation at the new site.

While a certain specific embodiment of the present invention has been disclosed as typical, the invention is of course not limited to this particular form, but rather is applicable broadly to all such variations as fall within the scope of the appended claims.

I claim:

1. A collector for receiving radiation from a source, comprising:
   an inflatable flexible bag extending generally circularly about an axis to be directed toward said source, and having a front wall of radiation passing flexible sheet material curved essentially annularly about said axis and convexly toward said source through which said radiation may pass to the interior of the bag, said bag having a rear wall of flexible sheet material curved generally annularly about said axis and concavely with respect to said source with a specularly radiation reflective concave forward surface acting to reflect radiation in concentrated form generally toward said axis; and
   a structure extending generally along said axis within said flexible bag and connected at opposite ends to central portions of said front and rear walls respectively to assist in maintaining the relative orientation of said walls and the shape of the inflated flexible bag;
   said structure having a collector portion within said bag and between said flexible front and rear walls for receiving radiation concentrated by said reflective rear wall.

2. A collector as recited in claim 1, in which said bag has a thickness dimension along said axis between said front and rear walls which is less than the maximum diameter of the bag transversely of said axis.

3. A collector as recited in claim 2, including a mechanism for moving said structure and said inflatable bag to follow said source of radiation for reception of radiation therefrom, and sensing means carried by said structure and responsive to changes in orientation of the structure relative to received radiation to actuate said mechanism for following said source of the radiation, said sensing means being located beyond the center of said bag in a direction toward said source.

4. A collector as recited in claim 3, in which said sensing means include two light responsive elements at opposite sides of said structure responsive to incoming radiation to actuate said mechanism for moving said structure and said bag in opposite directions and toward a null position.

5. A collector as recited in claim 1, in which said structure is an elongated heat-absorbing element extending along said axis and internally passaged for flow of a heat-absorbing fluid therethrough, there being mechanism for swinging said structure in two different mutually perpendicular planes to follow a source of radiation, a first pair of photosensors at diametrically opposite sides of said structure controlling movement of the structure and bag in opposite directions within a first of said planes, and a second pair of photosensors at diametrically opposite sides of said structure and offset 90° from said first photosensors and operable to control swinging movement of said structure and bag in opposite directions within a second of said planes, said first and second pairs of photosensors both being located beyond the center of said bag in a direction toward said source.

6. A collector as recited in claim 1, including a mechanism for moving said structure and said inflatable bag to follow said source of radiation for reception of radiation therefrom and sensing means carried by said structure and responsive to changes in orientation of the structure relative to received radiation to actuate said mechanism for following said source of the radiation, said sensing means being located beyond the center of said bag in a direction toward said source.

* * * * *